Patented June 27, 1933

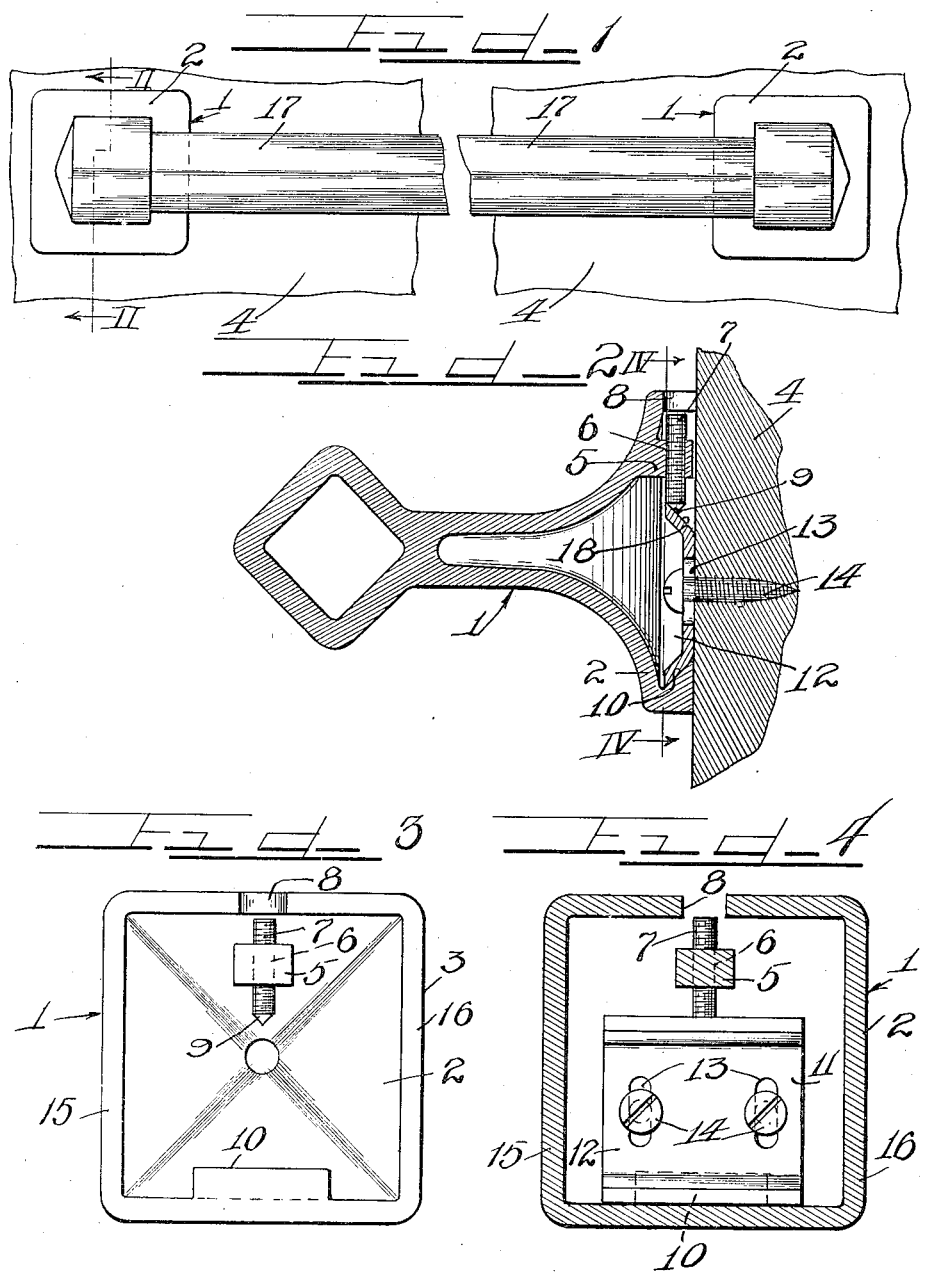

1,915,479

UNITED STATES PATENT OFFICE

EDWIN A. SMITH, OF CHICAGO, ILLINOIS, ASSIGNOR TO AMERICAN ENAMELED PRODUCTS COMPANY, OF CHICAGO, ILLINOIS, A CORPORATION OF ILLINOIS

CONCEALED FASTENER FOR WALL BRACKETS

Application filed January 16, 1931. Serial No. 509,182.

This invention relates to wall brackets or fixtures and concerns itself more particularly with a fastener therefor of the character which is concealed when the bracket or fixture is mounted on a wall or other support.

Wall brackets and fixtures are generally designed nowadays exteriorly to fit in with the artistic scheme of the walls or other supports to which they are intended to be secured, or with the room of which the wall or support forms a part. Naturally, it is desirable that such bracket or fixture be so secured as not to present to view any screws, bolts, or the like, due to the fact that such fastening instrumentalities detract greatly from the appearance both of the bracket and of the room in general. It is moreover desirable to secure the bracket or the like to its support in such a manner as to be adjustable thereon, yet securely held in place. While, in the past, some brackets, fixtures and the like have constituted tile blocks embedded in the wall or the like, this provides a permanent connection which is often times undesirable, since it is impossible to change the position of the bracket relative to its support. Often times, moreover, it is difficult to position such a bracket with respect to a wall exactly as one may wish, and as a result the bracket is located at a point which is somewhat inconvenient to the user.

It is accordingly one of the principal objects of the invention to provide a fastener construction which retains all the desirable characteristics, as to design and otherwise, of wall brackets or fixtures, without the disadvantages attending the same, and which in addition incorporates improvements over brackets or the like heretofore in vogue.

The invention contemplates, as one of its objects, the provision of a concealed fastening means for a wall bracket or fixture, which means will serve to hold the marginal portions of the bracket or the like in tight engagement with the support so that the bracket may in every respect harmonize with the design of the support to thereby present a pleasing appearance.

Another object in the invention is to provide concealed fastening means of the character referred to which includes a cam device to urge the bracket into engagement with the wall or other support to which it is secured.

Another object of the invention consists in providing a concealed fastening means providing for adjustment of the bracket or fixture relative to the support.

To the above and other ends, in carrying the invention into practice, the bracket or fixture forming the subject-matter of the present invention is provided with a hollow base adapted to engage the supporting wall. Interiorly of the base is a boss provided with a tapped opening for receiving a screw, the marginal portion of the base alined with the screw being cut away to provide access of a screw driver or the like to the screw, the inner end of the screw being substantially cone-shaped. The opposite marginal portion extends toward the screw and has an inclined surface facing away from the support for the bracket. The inclined surface and conical end of the screw are engageable with correspondingly inclined surfaces on the opposed flanges of a channel member, said member being provided with screws or the like for securing the same to the wall. It will thus be apparent that the screw may be forced into tight engagement with the corresponding inclined wall of the channel member, thereby exerting a camming force urging the base into tight engagement with the wall. The channel member is preferably of less length than the base, so that the latter may be shifted relative to the channel member. The channel member screws fit in slots in the channel member extending substantially at right angles to its flanges, thereby allowing for adjustment of the channel member in a corresponding direction relative to the support. The first screw is sufficiently short so that for all practical purposes it will not extend or be visible beyond the confines of the base of the bracket or fixture.

Other and further important objects and advantages of this invention will be apparent from the disclosure in the specification and accompanying drawing.

This invention, in its preferred form, is illustrated in the drawing and hereinafter more fully described.

Figure 1 is an elevational view of a fixture held by brackets contemplated by the invention, each bracket serving to conceal the bracket-securing means.

Figure 2 is an enlarged sectional view showing the concealed securing means made in accordance with this invention, and taken approximately in the plane indicated by the line II—II of Figure 1, certain parts being shown in elevation.

Figure 3 is an elevational view of the bracket per se.

Figure 4 is a sectional view taken approximately in the plane indicated by the line IV—IV of Figure 2.

Referring now more particularly to the drawing, wherein the same parts are designated by the same reference characters, the form of bracket made in accordance with the invention is indicated at 1 and is provided with a hollow base 2 whose margin 3 is adapted to lie flush with the surface of the supporting wall 4, as seen in Figure 2. The base 2 is provided with an interior stud or boss 5 having a tapped opening 6 in which a screw 7 is received. The marginal portion of the base adjacent the screw 7 is provided with an opening 8 to provide access of a screw driver to the screw, and the screw is of such proportions as to be entirely within the confines of the margin so that it is invisible for all practical purposes. The inner end 9 of the screw 7 is preferably conical, and the free extremity of the boss 5 is preferably spaced from the supporting wall when the bracket is in position so as not to interfere with the tight engagement of the margin of the base with the surface of the wall.

The marginal portion of the base opposite the opening 8 has an inclined surface 10 facing away from the wall or the like to which the bracket is to be connected. A channel-shaped member 11 is adapted to support the bracket and is provided with a web 12 engageable with the supporting wall 4, said web being provided with one or more transversely extending slots 13 through which retaining screws 14 pass and engage in the wall 4. It is obvious that the slots 13 provide for adjustment of the channel member 11 in one direction along the surface of the wall 4.

The channel member 11 is of less longitudinal extent than the space between the opposed marginal portions 15 and 16 of the base 2, thus providing for adjustment of the base relative to the channel member in a direction at right angles to the direction in which the channel member is adjustable with respect to the wall. From this, it will be appreciated that the bracket 1 is adjustable in two directions with respect to the supporting wall. Inasmuch as it is often desirable to accurately position the bracket 1 upon a certain chosen part of the wall, the advantages of this construction are apparent. It is moreover often desired to position a hand rail or towel rail at a certain height and extending from a certain desired direction. The ease with which this can be done with the present construction provides one of the outstanding advantages of the same over those heretofore in use.

In operation, each channel-member 11 is first placed in approximately the desired position on the support and screws 14 applied so that their heads bear with slight pressure on the web 12. With the screw 17 backed up, the base 2 is applied over the channel member into engagement with the surface of the support, and with the inclined surface 10 engaging the corresponding flange of the channel member. The base is then shifted along the channel member or, if desired, with the channel member, until the chosen location is reached, whereupon the bracket is removed, the screws 14 are driven home, the bracket replaced and adjusted, and the screw 7 is rotated into tight engagement with the channel member surface 18.

With the tight engagement of the inclined portion 10 and the screw 7 with the opposed flanges of the channel member 11, it will be apparent that, once the bracket is positioned securely in place, the same cannot accidentally shift from that place.

It will be seen from the foregoing that each bracket is readily removable from its support, and that it is a matter of but a moment to secure the same in the desired position. Moreover, the invention lends itself to use not only in connection with bathroom fixtures but with brackets generally, to be used for any purpose whatsoever. The bracket may be made of any material and in any desired shape, and may be finished in enamel or otherwise in any manner to suit the artistic taste. Moreover, the construction is exceedingly simple, requiring a minimum of parts which may be manufactured at a very low cost.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A concealed fastening means for securing a bracket to a support, comprising a channel member, means for securing said member to a support, with the web of said channel member in engagement with the support and flanges extending away from the support, a bracket having a hollow base for receiving said channel member, and means associated with said base for tightly gripping said flanges, the ends of the channel member being spaced apart a distance which is less than the distance between the marginal portions of the base adjacent the channel member ends, whereby said bracket is rendered adjustable relative to said member.

2. A concealed fastening means for securing a bracket to a support, comprising a channel member, means for securing said member to a support, with the web of said channel member in engagement with the support and flanges extending away from the support, a bracket having a hollow base for receiving said channel member, means associated with said base for tightly gripping said flanges, and means providing for adjustment of said bracket in two directions relative to the support.

3. A concealed fastening means for securing a bracket to a support, comprising a channel member, means for adjustably securing said member to a support, with the web of said channel member in engagement with the support and flanges extending away from the support, a bracket having a hollow base for receiving said channel member, and means associated with said base for adjustably gripping said flanges, said last means being readily separable, whereby said bracket may be readily removed from and applied into position.

4. A concealed fastening means for securing a bracket to a support, comprising a channel member, means for securing said member to a support, with the web of said channel member in engagement with the support and flanges extending away from the support, a bracket having a hollow base for receiving said channel member, and means associated with said base for tightly gripping said flanges, said last means including a member adjustable relative to said channel member.

In testimony whereof I have hereunto subscribed my name at Chicago, Cook County, Illinois.

EDWIN A. SMITH.